Apr. 24, 1923.
A. GISSLER
BRUSH
Filed March 22, 1922
1,452,502
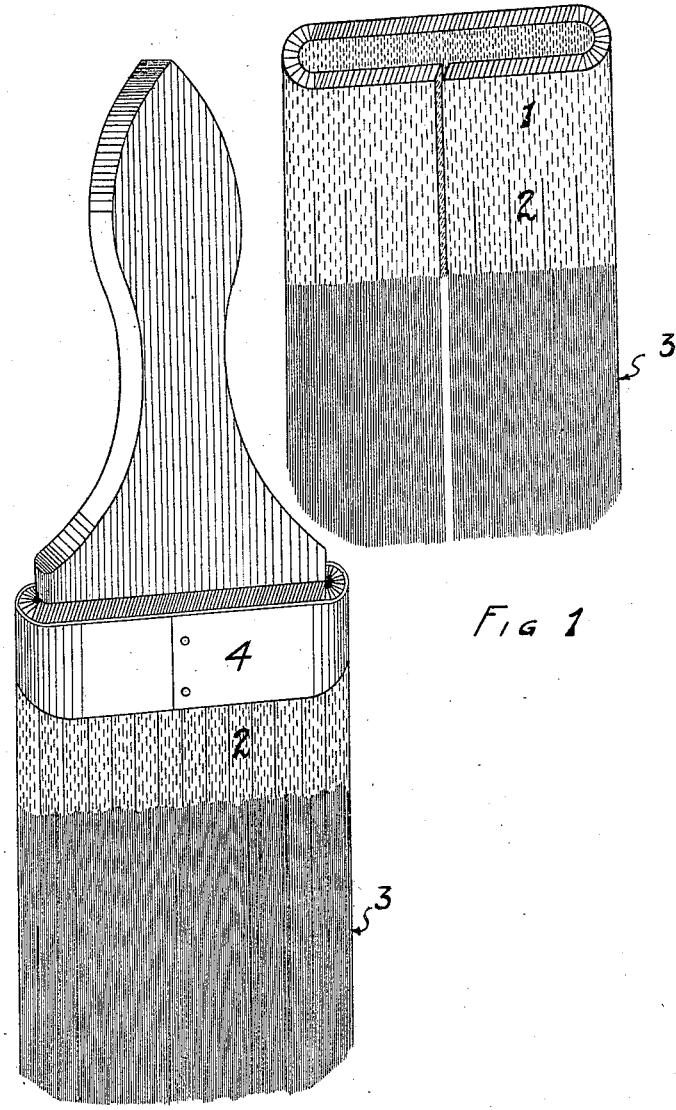
Witnesses.
August Gissler INVENTOR Patented Apr. 24, 1923.

1,452,502

UNITED STATES PATENT OFFICE.

AUGUST GISSLER, OF NEW YORK, N. Y.

BRUSH.

Application filed March 22, 1922. Serial No. 545,746.

*To all whom it may concern:*

Be it known that I, AUGUST GISSLER, a citizen of the United States, residing at 2355 Second Avenue, New York, N. Y., have invented a new Improvement in Brushes, of which the following is a specification.

The brush is made out of the bark of the Bombax tree.

In the accompanying drawing, forming a part of the specifications, are two illustrations.

Figure 1 shows a finished piece of bark ready to nail around a handle.

Figure 2 shows the finished brush.

In carrying the invention into effect the bark is removed from the tree in pieces of suitable size and the outer skin or cortical is detached therefrom.

The bark is then submerged in water long enough to effect fermentation in order to remove the nonresinous gum, which is soluble in water.

When the gum is removed the bark can easily be divided into fibres.

After the end of the piece of bark is cut square, it is held against revolving circular knives which divide the bark into narrow strips one quarter of an inch wide.

Then a revolving drum studded with sharp pointed round nails divides these strips three-fourths of their length into fibers, leaving one-fourth undivided, still one quarter of an inch wide.

The so divided bark is then cut off about one inch longer and when dry, appears like Figure (1) as 1, undivided bark, 2, one quarter of an inch wide strips, 3, separated fibres.

The dimensions of such pieces change according to size and shape of brush to be made.

Figure (2) shows the finished brush.

After the undivided piece of bark is nailed around the handle, a metallic band 4, the width of the undivided bark is drawn tightly around and nailed fast to give more strength and a better appearance to the brush.

The partly divided strips 2 give more flexibility and prevents clogging up of divided fibres 3.

Each fibre is fast on a strip and each strip fast on the undivided bark which is nailed fast to a handle, so fibres cannot fall out all at once as sometimes happens to badly cemented and wire bound bristle and fibre brushes.

The manufacture of these brushes does not require skilled labor therefore these brushes can be sold cheap.

Having thus fully described my invention, what I claim as new and desire to secure by Letters Patent is:—

The method of making a brush from tree bark, which consists in fermenting a piece of the bark to remove the gum, dividing a portion of the piece of fermented bark into strips by slits extending from one end of said piece and then further dividing the outer portions of said strips into fibers.

In testimony that I claim the foregoing as my own, I have hereto affixed my signature in the presence of two witnesses.

AUGUST GISSLER.

Witnesses:
HENRY H. JENNINGS,
HERMAN JAGLE.